United States Patent Office 2,931,802
Patented Apr. 5, 1960

2,931,802

MIXED ESTERS OF GLUCOSE AND SUCROSE

George P. Touey and Herman E. Davis, Kingsport, Tenn., assignors to Eastman Kodak Company, Rochester, N.Y., a corporation of New Jersey No Drawing. Application April 30, 1958
Serial No. 731,890

7 Claims. (Cl. 260—234)

This invention relates to organic solvent soluble short chain fatty acid esters of sucrose and of glucose and their method of preparation. In particular it relates to completely esterified or highly esterified mixed fatty acid esters of sucrose and glucose containing a combination of acetyl and propionyl groups, or acetyl (or propionyl) and isobutyryl groups as acyl substituents.

Sucrose octaacetate has been previously referred to as being useful in the preparation of adhesives, paper finishes, lacquers, resins, and plastics. This material is a white crystalline solid, its crystalline nature limiting its use as a plasticizing material. When this material is incorporated into cellulose ester film base materials at normal plasticizer concentrations such as 10–50%, the films cast therefrom become opaque and brittle due to crystallization of the sucrose octaacetate in the film. Also, sucrose octaacetate has relatively high solubility in water and poor resistance to hydrolysis. Other fatty acid esters of sucrose have disadvantages of one kind or another when used as a cellulose ester plasticizer. For instance, sucrose octa propionate is also a crystalline solid very similar in properties to the octaacetate. The normal butyrate ester of sucrose develops disagreeable odor when subjected to high humidities. The incorporation of considerable amounts of this material into cellulose ester films may result in soft, tacky surfaces. The simple esters of glucose possess similar characteristics when used as additives in cellulose ester compositions.

One object of our invention is to provide as new chemical compounds substantially completely esterified odorless sucrose or glucose acetate isobutyrates or acetate propionates characterized by non-crystallizing characteristics. Another object of our invention is to provide as new chemical compounds a substantially completely esterified odorless sucrose or glucose propionate isobutyrate which is noncrystallizing. A further object of our invention is to provide substantially completely esterified, organic solvent soluble sugar esters which due to their non-crystallizing property, lack of odor, and excellent heat and hydrolysis stability, are ideally suited as plasticizers or plasticizer extenders in cellulose ester compositions. A still further object of our invention is to provide a practical procedure for producing these non-crystallizing sugar esters. Other objects of our invention will appear herein.

It has been found that if a sucrose or glucose mixed ester is prepared containing at least 20% isobutyryl or propionyl based on the acyl content, the remainder being acetyl or propionyl, those esters when incorporated in cellulose ester compositions, do not crystallize or otherwise interfere with the clarity of products prepared therefrom, do not develop odor at high humidities and are resistant to heat and hydrolysis.

The esters in accordance with our invention are prepared by heating sucrose or glucose such as at 90–140° C. with a mixture of (1) isobutyric anhydride and acetic or propionic anhydride or (2) acetic and propionic anhydride in the presence of a salt of a weak organic acid until the product has been completely dissolved. Any unreacted anhydride and acid by-product are removed by distillation under reduced pressure. To remove traces of acid and the salt catalyst, the residue is dissolved in a water-immiscible inert solvent and the resulting solution is washed with dilute NaOH or $Na_2CO_3$, following which the aqueous layer is removed and the inert solvent is distilled off under reduced pressure. Ordinarily, 2–3 hours gives sufficient time to run the reaction to completion although longer times may be employed. If desired, an inert diluent may be employed in the esterification bath such as a ketonelike diethyl ketone, a hydrocarbon such as toluene, or a chlorinated hydrocarbon such as propylene chloride. If a solvent is used its boiling point should be within the range of 90–140° C. Acid diluents are preferably avoided since they may react with the anhydrides used, thereby altering the anhydride ratio employed.

To obtain non-crystallizing esters in accordance with our invention the proportions of the combinations acetic anhydride-propionic anhydride, acetic anhydride-isobutyric anhydride, or propionic anhydride-isobutyric anhydride must be controlled within definite limits. In the case of glucose the total molar quantity of anhydride must not be less than 5 or more than 8 for each mole of the glucose. In the case of sucrose, the total molar quantity of anhydride must be not less than 8 nor more than 12. In the case of glucose, the acetic anhydride should not be above 2 moles or below 0.25 mole per mole of glucose. The preferred ratio of reactants are 0.5–1.25 moles of acetic anhydride and 5.25–5.75 moles of isobutyric or propionic anhydride per mole of glucose. This gives (when using isobutyric anhydride) a substantially completely esterified glucose acetate isobutyrate having an acetyl content within the range of 4.3–23% and an isobutyryl content between 39.5 and 63%. In the case of the sucrose esters, the acetic anhydride should not be above 4 moles or below 1 mole per mole of sucrose being esterified. The most desirable ratio of reactants are within the range of 1–3 moles of acetic anhydride and 7–9 moles of isobutyric anhydride or propionic anhydride per mole of sucrose. There is thus obtained (when isobutyric anhydride is used a substantially completely esterified sucrose acetate isobutyrate with an acetyl content within the range of 5.0–25% and an isobutyryl content between 31.7 and 59%. When the amounts of the lower anhydrides are higher or lower than the limits specified, the products have a pronounced tendency to crystallize. Also, higher amounts of acetyl than specified gave products which are less resistant to hydrolysis.

The catalyst concentration may range from 1 to 20% based on the weight of the sugar. Ordinarily, a concentration of 8% catalyst is sufficient. The catalyst may be a sodium, potassium, lithium, or calcium salt of a weak organic acid. The preferred catalyst is a salt whose anion corresponds to the anhydride being used. For instance, in making sucrose or glucose acetate isobutyrate the preferred catalyst is sodium isobutyrate or a mixture of sodium acetate and sodium isobutyrate. It is most convenient to form the catalyst in situ by adding sodium hydroxide to the mixture of the two anhydrides in forming the esterification mass. The following examples illustrate our invention.

*Example 1.*—PREPARATION OF SUCROSE ACETATE ISOBUTYRATES 1 mole (342 grams) of sucrose and 0.69 mole (27.6 grams) of sodium hydroxide were added to a mixture of 8 moles of isobutyric anhydride and 2 moles of acetic anhydride. The mixture was rapidly stirred and was heated to 130° C. and maintained at that temperature for 2 hours. The faintly amber colored solution obtained was concentrated by removing the acids and excess anhydride under reduced pressure (2–5 mm. Hg.) at 90–100° C. The syrupy residue was dissolved in toluene and the resulting solution was thoroughly washed with aqueous 5% NaOH followed by several water washes. The toluene was removed by distillation yielding a clear, almost colorless highly viscous liquid which is sucrose acetate isobutyrate.

The procedure was repeated varying the amounts of acetic anhydride and isobutyric anhydride in the esterifying mixture as shown in the table.

| Run | Moles Sucrose | Moles Isobutyric Anhydride | Moles Acetic Anhydride | Percent Acetyl | Percent Isobutyryl | Hydrolysis Stability,[1] Percent | Physical Form |
|---|---|---|---|---|---|---|---|
| A | 1 | 9.5 | 0.5 | 4.9 | 56.2 | 0.01 | Heavy syrup crystallized within 3 days. |
| B | 1 | 9.0 | 1.0 | 10.1 | 49.9 | 0.02 | Heavy syrup had not crystallized after 6 months' storage. |
| C | 1 | 8.0 | 2.0 | 18.6 | 39.4 | 0 | Do. |
| D | 1 | 7.0 | 3.0 | 24.7 | 31.7 | 0.32 | Do. |
| E | 1 | 6.0 | 4.0 | 30.6 | 24.3 | 0.9 | Do. |

[1] The hydrolysis stability is expressed as percent acid formed (calculated as acetic acid) after the sample had been boiled in water for 96 hours.

Yields in all the above runs were in excess of 90%. The heat stability of each product was excellent when held at 190° C. for 2 hours. Analysis indicated each of the products were substantially the octa substituted esters.

Example 2.—PREPARATION OF SUCROSE PROPIONATE ISOBUTYRATE

A slurry was obtained by rapidly stirring together 1 mole (342 grams) of sucrose, 0.69 mole (27.6 grams) of sodium hydroxide, 8 moles of isobutyric anhydride and 2 moles of propionic anhydride and slowly heating to 140° C. This temperature was maintained for 2 hours with vigorous agitation. The light amber colored solution was processed as described in the preceding example. A thick syrup which is sucrose propionate isobutyrate was obtained. This procedure was repeated varying the amounts of propionic anhydride and isobutyric anhydride as shown in the table.

| Run | Moles Sucrose | Moles Isobutyric Anhydride | Moles Propionic Anhydride | Percent Propionyl | Percent Isobutyryl | Hydrolysis Stability,[1] Percent | Physical Form |
|---|---|---|---|---|---|---|---|
| A | 1 | 9.5 | 0.5 | 6.4 | 55.6 | 0.02 | Heavy syrup crystallized within 3 days. |
| B | 1 | 9.0 | 1.0 | 10.9 | 50.4 | 0.06 | Heavy syrup had not crystallized after 6 months' storage. |
| C | 1 | 8.0 | 2.0 | 19.7 | 42.1 | 0.02 | Do. |
| D | 1 | 7.0 | 3.0 | 26.7 | 33.3 | 0.15 | Do. |
| E | 1 | 6.0 | 4.0 | 31.8 | 27.8 | 0.20 | Do. |

[1] The hydrolysis stability is expressed as percent acid formed (calculated as propionic acid) after the sample had been boiled in water for 96 hours.

The heat stability of these products was excellent when tested at 190° C. for 2 hours. Yields were in excess of 90% and the products, in every case, were substantially octa substituted esters.

Example 3.—PREPARATION OF GLUCOSE ACETATE ISOBUTYRATE 1 mole (180 grams) of glucose and 0.25 mole (10 grams) of sodium hydroxide were rapidly stirred in a mixture consisting of 0.5 mole (51 grams) of acetic anhydride and 6 moles (948 grams) of isobutyric anhydride. The stirring was continued while the mixture was heated to and maintained at 130° C. for 2 hours. The amber colored solution obtained was concentrated by distilling off the excess anhydride and the acid formed under reduced pressure. The syrupy residue resulting was dissolved in 2 volumes of toluene and the solution was washed with aqueous NaOH followed by several water washes. The water layer was discarded and the toluene was removed by vacuum distillation. There was obtained 460 grams of a viscous, light colored, free-flowing liquid which was glucose acetate isobutyrate. The glucose acetate isobutyrate thus obtained was stable at 190° C. for 2 hours and had excellent hydrolysis stability in boiling water treated for 96 hours. The above procedure was repeated several times varying the amounts of acetic and isobutyric anhydride within the limits specified in the description. In every case, a non-crystallizing, light colored, viscous liquid was obtained in a yield of at least 90%. The products obtained had excellent heat and hydrolysis stability.

Example 4.—PREPARATION OF GLUCOSE ACETATE ISOBUTYRATE

A slurry was prepared by heating at 130° C. for 2 hours with rapidly stirring a mixture of 1 mole (180 grams) of glucose, 0.25 mole (10 grams) of sodium hydroxide, 1.0 mole (130 grams) of propionic anhydride, and 5.5 moles (869 grams) of isobutyric anhydride. The amber colored solution obtained was processed as in the preceding example. The glucose propionate isobutyrate thus obtained had excellent heat and hydrolysis stability. This procedure was repeated with varied ratios of propionic anhydride and isobutyric anhydride in the esterifying mixture as specified in the description. Yields of 90% or better of non-crystalline glucose isobutyrates were obtained having properties very similar to those described above.

Example 5.—PREPARATION OF GLUCOSE AND SUCROSE ACETATE PROPIONATES

A slurry was prepared by mixing together one mole (180 grams) of anhydrous glucose and 0.135 mole (5.4 grams) of sodium hydroxide with a mixture of 5.5 moles of propionic anhydride and 1 mole of acetic anhydride rapidly stirring and heating slowly to 120° C. over a period of 1 hour. All of the sugar had dissolved forming a pale yellow solution. The mass was heated with stirring at 120° C. for another hour and the mass was then subjected to distillation at 100° C. under reduced pressure thereby removing the acid by-product formed and the slight excess of anhydride therein. There was thereby obtained glucose acetate propionate. The product was dissolved in toluene and was washed with dilute sodium hydroxide and then with distilled water which removed the catalyst, traces of acid, and essentially all of the color from the product. The toluene was removed by distilling at reduced pressure and the glucose acetate propionate was obtained which was a water white highly viscous liquid. The acetyl content was 16.8% and the propionyl content was 43.2% indicating substantial complete esterification of the glucose. The product was heated at 190° C. for 6 hours before it exhibited any appreciable amount of discoloration. The product was tested by seeding with crystals of glucose pentaacetate and glucose pentapropionate. Even though the material was stored for 1 month at 25° C., no additional crystals had developed in the samples.

A series of glucose and sucrose acetate propionates were prepared in the manner described except that ratios of acetic and propionic anhydride were varied. The properties of the products obtained were as shown in the table.

Although sucrose and glucose are the preferred sugars for use as the starting material in preparing mixed esters because of their low cost and desirability in a highly purified state, it is understood that other mono or other disaccharides can be used in this connection. For example, lactose, maltose, and cellobiose or such sugar materials as sorbitol (hydrogenated glucose) and α-methyl-D-glucoside.

We claim:
1. Sucrose acetate isobutyrate.
2. Sucrose propionate isobutyrate.
3. Sucrose acetate propionate.
4. Glucose acetate isobutyrate.
5. Glucose propionate isobutyrate.
6. Glucose acetate propionate.
7. As new compositions of matter non-crystallizing, highly viscous, completely esterified esters of sucrose and of glucose having two different acyl substituents selected from the group consisting of acetyl, propionyl and isobutyryl.

*Table I*

ACETATE-PROPIONATE ESTERS OF GLUCOSE AND SUCROSE

| Run | Molar Quantity of Sugar | Molar Quantity of Acetic Anhydride | Molar Quantity of Propionic Anhydride | Product | |
|---|---|---|---|---|---|
| | | | | Acyl Content | Appearance |
| 1 | 1 Glucose | 0.5 | 6.0 | 9.6% Acetyl / 51.2% Propionyl | Viscous Liquid. |
| 2 (Same as Example 1) | do | 1.0 | 5.5 | 16.8% Acetyl / 43.2% Propionyl | Do. |
| 3 | do | 2.0 | 4.5 | 37.7% Acetyl / 20.8% Propionyl | Do. |
| 4 | 1 Sucrose | 1.0 | 9.0 | 11.3% Acetyl / 44.9% Propionyl | Do. |
| 5 | do | 2.0 | 8.0 | 17.2% Acetyl / 38.1% Propionyl | Do. |
| 6 | do | 3.0 | 7.0 | 29.9% Acetyl / 23.8% Propionyl | Do. |

After a month's storage at room temperature there was no evidence of crystallization in any of the products.

References Cited in the file of this patent

UNITED STATES PATENTS

| | | |
|---|---|---|
| 1,938,044 | Schmidt et al. | Dec. 5, 1933 |
| 1,959,590 | Lorand | May 22, 1934 |
| 2,013,034 | Cox et al. | Sept. 3, 1935 |
| 2,024,651 | Malm et al. | Dec. 17, 1935 |
| 2,174,541 | Walthausen et al. | Oct. 3, 1939 |
| 2,671,779 | Gaver et al. | Mar. 9, 1954 |
| 2,828,303 | Malm et al. | Mar. 25, 1958 |
| 2,828,304 | Malm et al. | Mar. 25, 1958 |

FOREIGN PATENTS

| | | |
|---|---|---|
| 552,161 | Great Britain | Nov. 25, 1943 |